US008352935B2

(12) United States Patent
Isaacson et al.

(10) Patent No.: US 8,352,935 B2
(45) Date of Patent: Jan. 8, 2013

(54) SYSTEM FOR CREATING A CUSTOMIZED SOFTWARE DISTRIBUTION BASED ON USER REQUIREMENTS

(75) Inventors: Scott A. Isaacson, Woodland Hills, UT (US); Eric W. B. Anderson, Alpine, UT (US); Robert Wipfel, Draper, UT (US)

(73) Assignee: Novell, Inc., Provo, UT (US)

( * ) Notice: Subject to any disclaimer, the term of this patent is extended or adjusted under 35 U.S.C. 154(b) by 1056 days.

(21) Appl. No.: 11/134,535

(22) Filed: May 19, 2005

(65) Prior Publication Data
US 2006/0265702 A1 Nov. 23, 2006

(51) Int. Cl.
G06F 9/45 (2006.01)
G06F 9/44 (2006.01)
G06F 9/445 (2006.01)
G06F 15/16 (2006.01)

(52) U.S. Cl. ........ 717/173; 717/140; 717/178; 709/227; 709/229

(58) Field of Classification Search .................. None
See application file for complete search history.

(56) References Cited

U.S. PATENT DOCUMENTS

| 4,918,653 | A | | 4/1990 | Johri et al. |
| 5,664,206 | A | | 9/1997 | Murrow et al. |
| 5,713,024 | A | | 1/1998 | Halladay |
| 5,721,824 | A | | 2/1998 | Taylor |
| 5,732,212 | A | * | 3/1998 | Perholtz et al. ............... 709/224 |
| 5,748,890 | A | | 5/1998 | Goldberg et al. |
| 5,835,777 | A | * | 11/1998 | Staelin .......................... 717/175 |
| 5,894,571 | A | * | 4/1999 | O'Connor ......................... 713/2 |
| 5,901,227 | A | | 5/1999 | Perlman |
| 5,950,010 | A | | 9/1999 | Hesse et al. |
| 5,961,593 | A | | 10/1999 | Gabber et al. |
| 6,144,959 | A | | 11/2000 | Anderson et al. |
| 6,161,139 | A | | 12/2000 | Win et al. |

(Continued)

FOREIGN PATENT DOCUMENTS
GB 2419711 5/2006

OTHER PUBLICATIONS

Christian Alan Mattmann; Software Connectors for Highly Distributed and Voluminous Data-Intensive Systems; Dec. 2007 [online]; retrieved on Sep. 20, 2012; pp. 1-300; Retrieved from the Internet: <URL: http://sunset.usc.edu/~mattmann/Dissertation.pdf>.*

(Continued)

Primary Examiner — Thuy Dao
Assistant Examiner — Hanh T Bui
(74) Attorney, Agent, or Firm — Marger Johnson & McCollom PC

(57) ABSTRACT

A customized distribution, e.g. of Linux software, is built using only packages that satisfy a customer's individual requirements. The packages are verified, at build time, to be interoperable at run-time. Also, the distribution is verified to ensure all package dependencies are included. In cases where no package already exists that meets a user requirements, a new package can be created for this purpose. The packages in the distribution customized for the user can be tracked, so that as updates to the packages are released, the customer can be notified about those updates (without being notified about packages not in the customer's customized distribution). Finally, once the distribution has been built for the user, it can then be offered as a general-purpose distribution for future customers.

45 Claims, 13 Drawing Sheets

U.S. PATENT DOCUMENTS

| | | | |
|---|---|---|---|
| 6,205,579 B1 | 3/2001 | Southgate | |
| 6,256,774 B1 | 7/2001 | O'Leary et al. | |
| 6,259,442 B1* | 7/2001 | Britt et al. | 715/721 |
| 6,282,711 B1 | 8/2001 | Halpern et al. | |
| 6,301,707 B1 | 10/2001 | Carroll et al. | |
| 6,324,691 B1 | 11/2001 | Gazdik | |
| 6,353,926 B1 | 3/2002 | Parthesarathy et al. | |
| 6,367,075 B1 | 4/2002 | Kruger et al. | |
| 6,385,766 B1* | 5/2002 | Doran et al. | 717/174 |
| 6,421,777 B1 | 7/2002 | Pierre-Louis et al. | |
| 6,457,130 B2 | 9/2002 | Hitz et al. | |
| 6,460,060 B1 | 10/2002 | Maddalozzo et al. | |
| 6,493,871 B1 | 12/2002 | McGuire et al. | |
| 6,539,473 B1 | 3/2003 | Hubacher et al. | |
| 6,539,539 B1* | 3/2003 | Larsen et al. | 717/124 |
| 6,606,744 B1 | 8/2003 | Mikurak | |
| 6,615,406 B1 | 9/2003 | Amberg et al. | |
| 6,651,085 B1 | 11/2003 | Woods | |
| 6,725,452 B1 | 4/2004 | Te'eni et al. | |
| 6,728,711 B2* | 4/2004 | Richard | 707/9 |
| 6,735,757 B1* | 5/2004 | Kroening et al. | 717/120 |
| 6,775,829 B1 | 8/2004 | Kroening | |
| 6,799,208 B1 | 9/2004 | Sankaranarayan et al. | |
| 6,892,382 B1 | 5/2005 | Hapner et al. | |
| 6,928,644 B1 | 8/2005 | Kroening et al. | |
| 6,981,028 B1 | 12/2005 | Rawat et al. | |
| 7,006,993 B1 | 2/2006 | Cheong et al. | |
| 7,013,340 B1* | 3/2006 | Burd et al. | 709/229 |
| 7,013,461 B2 | 3/2006 | Hellerstein et al. | |
| 7,016,959 B2 | 3/2006 | Dinh et al. | |
| 7,051,327 B1 | 5/2006 | Milius et al. | |
| 7,055,149 B2 | 5/2006 | Birkholz et al. | |
| 7,093,247 B2 | 8/2006 | Ashworth et al. | |
| 7,096,465 B1* | 8/2006 | Dardinski et al. | 717/178 |
| 7,143,067 B1* | 11/2006 | Cheston et al. | 705/59 |
| 7,177,859 B2 | 2/2007 | Pather et al. | |
| 7,181,768 B1 | 2/2007 | Ghosh et al. | |
| 7,185,047 B1 | 2/2007 | Bate et al. | |
| 7,222,218 B2 | 5/2007 | Dutt et al. | |
| 7,251,812 B1* | 7/2007 | Jhanwar et al. | 717/171 |
| 7,272,815 B1 | 9/2007 | Eldridge et al. | |
| 7,284,243 B2 | 10/2007 | Burgess | |
| 7,302,634 B2 | 11/2007 | Lucovsky et al. | |
| 7,316,013 B2* | 1/2008 | Kawano et al. | 717/173 |
| 7,350,075 B1 | 3/2008 | Eastham | |
| 7,353,533 B2 | 4/2008 | Wright et al. | |
| 7,356,679 B1 | 4/2008 | Le et al. | |
| 7,389,355 B2* | 6/2008 | Brown et al. | 709/229 |
| 7,398,480 B2 | 7/2008 | Zimniewicz et al. | |
| 7,398,524 B2 | 7/2008 | Shapiro | |
| 7,424,617 B2 | 9/2008 | Boyd et al. | |
| 7,478,381 B2 | 1/2009 | Roberts et al. | |
| 7,506,335 B1* | 3/2009 | Wooff et al. | 717/173 |
| 7,506,337 B2* | 3/2009 | Iyer | 717/177 |
| 7,506,338 B2 | 3/2009 | Alpern et al. | |
| 7,539,978 B1 | 5/2009 | Haddox et al. | |
| 7,546,594 B2 | 6/2009 | McGuire et al. | |
| 7,571,427 B2 | 8/2009 | Wang et al. | |
| 7,574,706 B2 | 8/2009 | Meulemans et al. | |
| 7,577,722 B1 | 8/2009 | Khandekar et al. | |
| 7,606,919 B2* | 10/2009 | Labedz et al. | 709/229 |
| 7,610,583 B2* | 10/2009 | Milius | 717/178 |
| 7,634,573 B2* | 12/2009 | Matsukura et al. | 709/229 |
| 7,797,431 B2* | 9/2010 | Franklin et al. | 709/227 |
| 7,802,246 B1* | 9/2010 | Kennedy et al. | 717/173 |
| 7,814,477 B2* | 10/2010 | Sun et al. | 717/173 |
| 7,853,609 B2 | 12/2010 | Dehghan et al. | |
| 8,051,178 B2* | 11/2011 | Skidgel | 709/227 |
| 8,074,214 B2* | 12/2011 | Isaacson et al. | 717/173 |
| 8,122,445 B2* | 2/2012 | Huang | 717/173 |
| 2001/0023440 A1 | 9/2001 | Franklin et al. | |
| 2001/0029605 A1 | 10/2001 | Forbes et al. | |
| 2002/0007330 A1 | 1/2002 | Kumar et al. | |
| 2002/0007380 A1 | 1/2002 | Bauchot et al. | |
| 2002/0010757 A1 | 1/2002 | Granik et al. | |
| 2002/0019879 A1 | 2/2002 | Jasen et al. | |
| 2002/0069282 A1* | 6/2002 | Reisman | 709/227 |
| 2002/0095672 A1* | 7/2002 | Evans et al. | 717/175 |
| 2002/0100036 A1 | 7/2002 | Moshir et al. | |
| 2002/0147970 A1* | 10/2002 | Smith et al. | 717/140 |
| 2002/0147974 A1* | 10/2002 | Wookey | 717/176 |
| 2002/0156877 A1 | 10/2002 | Lu et al. | |
| 2002/0162030 A1 | 10/2002 | Brezak et al. | |
| 2003/0014656 A1 | 1/2003 | Ault et al. | |
| 2003/0023963 A1* | 1/2003 | Birkholz et al. | 717/172 |
| 2003/0037107 A1 | 2/2003 | Maeda | |
| 2003/0037328 A1* | 2/2003 | Cicciarelli et al. | 717/178 |
| 2003/0061202 A1* | 3/2003 | Coleman | 707/3 |
| 2003/0066057 A1* | 4/2003 | RuDusky | 717/140 |
| 2003/0115292 A1 | 6/2003 | Griffin et al. | |
| 2003/0121024 A1 | 6/2003 | Hill et al. | |
| 2003/0126214 A1* | 7/2003 | Oliszewski | 709/206 |
| 2003/0131073 A1 | 7/2003 | Lucovsky et al. | |
| 2003/0149749 A1 | 8/2003 | Carlucci et al. | |
| 2003/0172127 A1 | 9/2003 | Northrup et al. | |
| 2003/0182414 A1 | 9/2003 | O'Neill | |
| 2003/0195970 A1 | 10/2003 | Dinh et al. | |
| 2003/0200149 A1 | 10/2003 | Gonzalez et al. | |
| 2003/0217123 A1* | 11/2003 | Anderson et al. | 709/219 |
| 2003/0221190 A1 | 11/2003 | Deshpande et al. | |
| 2004/0003266 A1* | 1/2004 | Moshir et al. | 713/191 |
| 2004/0006710 A1 | 1/2004 | Pollutro et al. | |
| 2004/0015831 A1* | 1/2004 | Bowhill | 717/106 |
| 2004/0015946 A1 | 1/2004 | Te'eni et al. | |
| 2004/0015956 A1* | 1/2004 | Barfield et al. | 717/178 |
| 2004/0015961 A1* | 1/2004 | Chefalas et al. | 717/178 |
| 2004/0025048 A1 | 2/2004 | Porcari et al. | |
| 2004/0049697 A1 | 3/2004 | Edwards, Jr. et al. | |
| 2004/0093417 A1* | 5/2004 | Perry | 709/227 |
| 2004/0102182 A1 | 5/2004 | Reith et al. | |
| 2004/0196981 A1 | 10/2004 | Nakano et al. | |
| 2004/0205748 A1* | 10/2004 | Iyer | 717/174 |
| 2004/0254976 A1 | 12/2004 | Malik et al. | |
| 2004/0255291 A1 | 12/2004 | Sierer et al. | |
| 2005/0002057 A1 | 1/2005 | Oe | |
| 2005/0005152 A1* | 1/2005 | Singh et al. | 713/200 |
| 2005/0081055 A1 | 4/2005 | Patrick et al. | |
| 2005/0097353 A1 | 5/2005 | Patrick et al. | |
| 2005/0120054 A1 | 6/2005 | Shulman et al. | |
| 2005/0120340 A1* | 6/2005 | Skazinski et al. | 717/140 |
| 2005/0125677 A1 | 6/2005 | Michaelides | |
| 2005/0132179 A1 | 6/2005 | Glaum et al. | |
| 2005/0132349 A1 | 6/2005 | Roberts et al. | |
| 2005/0134896 A1 | 6/2005 | Koga | |
| 2005/0144615 A1* | 6/2005 | Chen et al. | 717/169 |
| 2005/0223374 A1* | 10/2005 | Wishart et al. | 717/173 |
| 2005/0246588 A1 | 11/2005 | Deng et al. | |
| 2005/0289524 A1* | 12/2005 | McGinnes | 717/140 |
| 2006/0021065 A1 | 1/2006 | Kamperman et al. | |
| 2006/0047657 A1 | 3/2006 | Frieder et al. | |
| 2006/0059359 A1 | 3/2006 | Reasor et al. | |
| 2006/0090208 A1 | 4/2006 | Smith | |
| 2006/0123101 A1 | 6/2006 | Buccella et al. | |
| 2006/0123414 A1* | 6/2006 | Fors et al. | 717/177 |
| 2006/0137000 A1 | 6/2006 | Isaacson | |
| 2006/0155838 A1 | 7/2006 | Wu et al. | |
| 2006/0168573 A1* | 7/2006 | Clark et al. | 717/140 |
| 2006/0174238 A1 | 8/2006 | Henseler et al. | |
| 2006/0184934 A1* | 8/2006 | Karlberg | 717/178 |
| 2006/0218544 A1 | 9/2006 | Chakraborty et al. | |
| 2006/0230124 A1 | 10/2006 | Belfiore et al. | |
| 2006/0265597 A1 | 11/2006 | Carey et al. | |
| 2006/0277542 A1 | 12/2006 | Wipfel | |
| 2007/0006205 A1 | 1/2007 | Kennedy et al. | |
| 2007/0111726 A1 | 5/2007 | Lambert et al. | |
| 2008/0295092 A1* | 11/2008 | Tan et al. | 717/178 |
| 2012/0054357 A1* | 3/2012 | Kuritzky et al. | 709/229 |

OTHER PUBLICATIONS

Brian Robinson et al.; Scaling Up Automated Test Generation: Automatically Generating Maintainable Regression Unit Tests form Programs; 2011 [online]; retrieved on Sep. 12, 2012; pp. 23-32; Retrieved from the Internet: <URL: http://delivery.acm.org/10.1145/2200000/2190143/06100059.pdf?>.*

Geoffroy Vallee; SSI-OSCAR: a Cluster Distribution for High Performance Computing Using a Single System Image; 2005 [online].

retrieved on 212-09-20; pp. 1-7. Retrieved from the Internet: <URL: http://ieeexplore.ieee.org/stamp/stamp.jsp?tp=&arnumber=1430089>.*
"Firefox Help: How to Manage Profiles"; http://www.mozilla.org/support/firefox/profile; printed on Aug. 27, 2007; pp. 1-4.
"XenFaq—Xen Wiki"; http://www.wiki.xensource.com/xenwiki/XenFaq; printed on Aug. 27, 2007; pp. 1-7.
Buytaert, Kris; "Linux Virtualization with Xen"; LinuxDevCenter.com; http://www.linuxdevcenter.com/pub/a/linux/2006/01/26/xen.html; Jan. 26, 2006; pp. 1-3.
Rosen, Rami; "Introduction to the Xen Virtual Machine"; LinuxJournal.com; http://www.linuxjournal.com/article/8540; Sep. 1, 2005; pp. 1-10.
Clark, Bryan; "A Moment of Xen: Virtualize Linux to Test Your Apps"; IBM.com; http://www-128.ibm.com/developerworks/linux/library/l-xen/; Mar. 15, 2005; pp. 1-6.
Bhuta et al., "A framework for identification and resolution of interoperability mismatchs in COTS based system", IEEE IWICSS, 2007, pp. 1-6.
Chapman et al., "Contemplating systemic software reuse in project centric company", ACM SAICSIT, 2008, pp. 16-26.
Gill et al., "Resuability issued in component based development", ACM, 2003, pp. 1-5.
Lymer et al., "Experience in using business scenarios to access COTS components in integrated solutions", ACM, 2005, pp. 1-15.
YourDictionary.com, Remote boot, retrieved on Jan. 5, 2010 from https:///www.yourdictionary.com/computer/remote-boot.
"A Third Phase of Internet Search"; http://getoutfoxed.com/booklprint/46; printed on Aug. 28, 2007; p. 1-2.
"Abstract"; http://getoutfoxed.com/booklprint/36; printed on Aug. 28, 2007; p. 1.
"Beyond Outfoxed"; http://getoutfoxed.com/booklprint/88; printed on Aug. 28, 2007; p. 1.
"Calculating Levels of Trust"; http://getoutfoxed.com/booklprint/112; printed on Aug. 28, 2007; pp. 1-2.
"Comparison to Existing Systems"; http://getoutfoxed.com/booklprint/47; printed on Aug. 28, 2007; pp. 1-3.
"Files & Processes"; http://getoutfoxed.com/booklprint/84; printed on Aug. 28, 2007; p. 1.
"How it Works"; http://getoutfoxed.com/booklprint/87; printed on Aug. 28, 2007; p. 1.
"Keeping Your Network Clean"; http://getoutfoxed.com/booklprint/108; printed on Aug. 28, 2007; p. 1.
"Novell ZENworks 7 Suite: Your Complete Identity-driven IT Resource Management Solution"; Novell, Inc. Product Guide; http://www.novell.com; (2006); pp. 1-11.
"Novell ZENworks Configuration Management: Complete Systems Management to Lower Your Total Cost of Ownership"; Novell, Inc. Product Guide; http://www.novell.com; (2007); pp. 1-11.
"Novell ZENworks Endpoint Security Management: Total Control from a Single Console"; Novell, Inc. Technical White Paper; http://www.novell.com; (2007); pp. 1-11.
"Novell ZENworks Orchestrator Virtual Machine Management Guide 1.1"; Novell, Inc.; http://www.novell.com; (2007); pp. 1-109.
"Novell ZENworks"; Wikipedia, the free encyclopedia; http://en.wikipedia.org/wiki/ZENworks; Printed on Aug. 28, 2007; pp. 1-3.
"Objections"; http://getoutfoxed.com/booklprint/35; printed on Aug. 28, 2007; p. 1.
"Objections"; http://getoutfoxed.com/booklprint/86; printed on Aug. 28, 2007; p. 1.
"Orchestrating the Data Center with Novell ZENworks"; Novell Solution Flyer; http://www.novell.com; (2007), pp. 1-4.
Tridgell, A. et al., "The rsync algorithm," retrieved at http://www.samba.org/rsync/tech_report/node2.html, Nov. 9, 1998, p. 1.
"Phishing, Spyware, Crapware, Adware"; http://getoutfoxed.com/booklprint/85; printed on Aug. 28, 2007; p. 1.

"Search & Browsing"; http://getoutfoxed.com/booklprint/83; printed on Aug. 28, 2007; p. 1.
"Small World Networks"; http://getoutfoxed.com/booklprint/62; printed on Aug. 28, 2007; pp. 1-2.
"Socially Aware Surfing and Shopping"; http://getoutfoxed.com/booklprint/73; printed on Aug. 28, 2007; p. 1.
"Tagging and Folksonomy"; http://getoutfoxed.com/booklprint/96; printed on Aug. 28, 2007; p. 1.
"Three Magic Ingredients"; http://getoutfoxed.com/booklprint/32; printed on Aug. 28, 2007; p. 1.
"What Outfoxed is Not"; http://getoutfoxed.com/booklprint/34; printed on Aug. 28, 2007; p. 1.
Adorno, Kerry, "Novell Delivers Industry's Most Comprehensive Systems Management Solution"; Novell, Inc.; http://www.novell.com/news/press/novell-delivers-industrys-most-comprehensive-systems-management-solution; Waltham, Massachusetts; Aug. 14, 2007; p. 1.
Aiken, Peter et al., Microsoft Computer Dictionary; Fifth Edition; Microsoft Press; 2002.
Bailey, E.C., Maximum RPM, Red Hat Inc., 2000, ISBN 1-888172-78-9, http://www.redhat.com/docs/books/max-rpm/index.html, pp. 1-565.
Cowan, Crispin, Arnold, Seth, Beattie, Steve, Wright, Chris, & Viega, John "Defcon Capture the Flag: Defending Vulnerable Code from Intense Attack"; USA; 2003, pp. 1-53.
Cowan, Crispin, Arnold, Seth, Beattie, Steve, Wright, Chris, & Viega, John, "Immunix & Defcon: Defending Vulnerable Code From Intense Attack"; Immunix; USA; 2003.
Cowan, Crispin, Beattie, Steve, Kroah-Hartman, Greg, Pu, Calton, Wagle, Perry, & Gligor, Virgil, "SubDomain: Parsimonious Server Security"; Proceedings of the 14th Systems Administration Conference; The Usenix Association; USA; 2000.
Forrest, Stephanie "Computer Immunnology"; ACM; Oct. 1997; pp. 88-96.
Fusco, John, "The Linux Programmer's Toolbox"; Prentice Hall; 2007; Chapter 5, "What Every Developer Should Know about the Kernel," pp. 222-224.
Garfinkel, Simson & Spaford, Gene, "Practical Unix & Internet Security"; Second edition; ISBN 1-56592-148-8; Apr. 1996; Chapters 3.1, 3.2,4.1,4.2.
James, Stan; "Outfoxed in a Nutshell"; http://getoutfoxed.com/nutshell; printed on Aug. 28, 2007; pp. 1-3.
James, Stan; "Outfoxed in a Nutshell: What does Outfoxed add to my Browser?"; http://getoutfoxed.com/nutshell/ node/106; printed on Aug. 28, 2007; pp. 1-3.
James, Stan; "What is Outfoxed?"; http://getoutfoxed.com/about; printed on Aug. 28, 2007; pp. 1-2.
Newham, C. et al., "Learning the Bash Shell," 2nd Ed., O'Reilly & Associates, 1998, p. 13.
Nemeth, Evi et al., "Linux Administration Handbook"; Prentice Hall; 2006; Chapter 12—TCP/IP Networking, pp. 276-277.
Silva, G.N., APT HOWTO, Chapter 5—Getting Information about packages, Aug. 2001, http://web.archive.org/web/20010911133902/http://www.debian.org/doc/manuals/apt-howto-ch-sourcehandling.en.html.
Silva, G.N., APT HOWTO, Chapter 6—Working with source packages, Aug. 2001, http://web.archive.org/web/20010911133902/http://www.debian.org/doc/manuals/apt-howto/ch-sourcehandling.en.html.
Tanenbaum, Andrew S., "Computer Networks"; Third edition; Prentice Hall; 1996; pp. 29, 44.
Tanenbaum, Andrew; "Modern Operating Systems"; Second edition; Prentice Hall, Upper Saddle River, NJ; 2001; pp. 753-757.

* cited by examiner

| 120 | Kernel XYZ | Security ABC | File System XYZ | Encryption MNO | Mail Server ABC |
|---|---|---|---|---|---|
| Kernel XYZ | | X 430 | | | |
| Security ABC | X 431 | | | | |
| File System XYZ | | X 433 | X 432 | | |
| Encryption MNO | | | | | X 434 |
| Mail Server ABC | | | | X 435 | |

FIG. 4

SYSTEM FOR CREATING A CUSTOMIZED SOFTWARE DISTRIBUTION BASED ON USER REQUIREMENTS

RELATED APPLICATION DATA

This application is related to co-pending, commonly assigned U.S. patent application Ser. No. 11/134,541, titled "SYSTEM FOR CREATING A CUSTOMIZED SOFTWARE INSTALLATION ON DEMAND," filed May 19, 2005 by the same inventors, hereby incorporated by reference.

FIELD OF THE INVENTION

This invention pertains to creating a distribution of software packages, and more particularly preparing and validating the interoperability at build-time of a software distribution that includes only packages that a customer wants.

BACKGROUND OF THE INVENTION

Software distributions are typically built into an installation program and stored on a compact disc (CD), to be purchased by the customer. Such distributions usually include at least one program file and a number of other packages that work with the program file to provide additional functionality and features. These CDs are prepackaged and designed to include features that the company selling the software thinks will be desired by customers.

Manufacturers of such software products recognize that a "one size fits all" mentality often does not work for all clients. Thus, manufacturers sometimes produce multiple different versions of a software package. For example, application suites are very popular products today. Most versions include a word processor and a spreadsheet program. But some versions might include a database package, whereas other versions might include a slideshow generating program. Still other versions might include stripped-down versions of the products, priced to sell to students and educators. By offering different versions of the product, the manufacturer hopes that as many customers as possible will be satisfied by the different versions, thereby maximizing the manufacturer's sales.

This approach to building pre-packaged software installations is used not just with application software, but also with operating systems. For example, in selecting a Linux® distribution, a customer must choose between different packages of distributions that have been released and are available in off-the-shelf combinations. (Linux is a registered trademark of Linus Torvalds.) A customer typically chooses a Linux distribution by first selecting a vendor who sells Linux distributions, and then identifying a particular distribution available from the vendor that has the most features that the customer is looking for. But if a customer wants a finer level of control in selecting the structure of the Linux distribution, the customer is usually left wanting.

Accordingly, a need remains to create customized software distributions for a client, including only packages that the client wants, and including any required package dependencies.

SUMMARY OF THE INVENTION

A customized distribution is built from a set of available packages to satisfy a customer's individual requirements. Only packages that are needed to fulfill the customer's requirements are included in the distribution. The result is a lean customized distribution created specially for the customer.

The foregoing and other features, objects, and advantages of the invention will become more readily apparent from the following detailed description, which proceeds with reference to the accompanying drawings.

BRIEF DESCRIPTION OF THE DRAWINGS

FIG. 4 shows an example table in the database of package run-time conflicts of FIG. 1.

DETAILED DESCRIPTION OF THE PREFERRED EMBODIMENT

Figure 1:
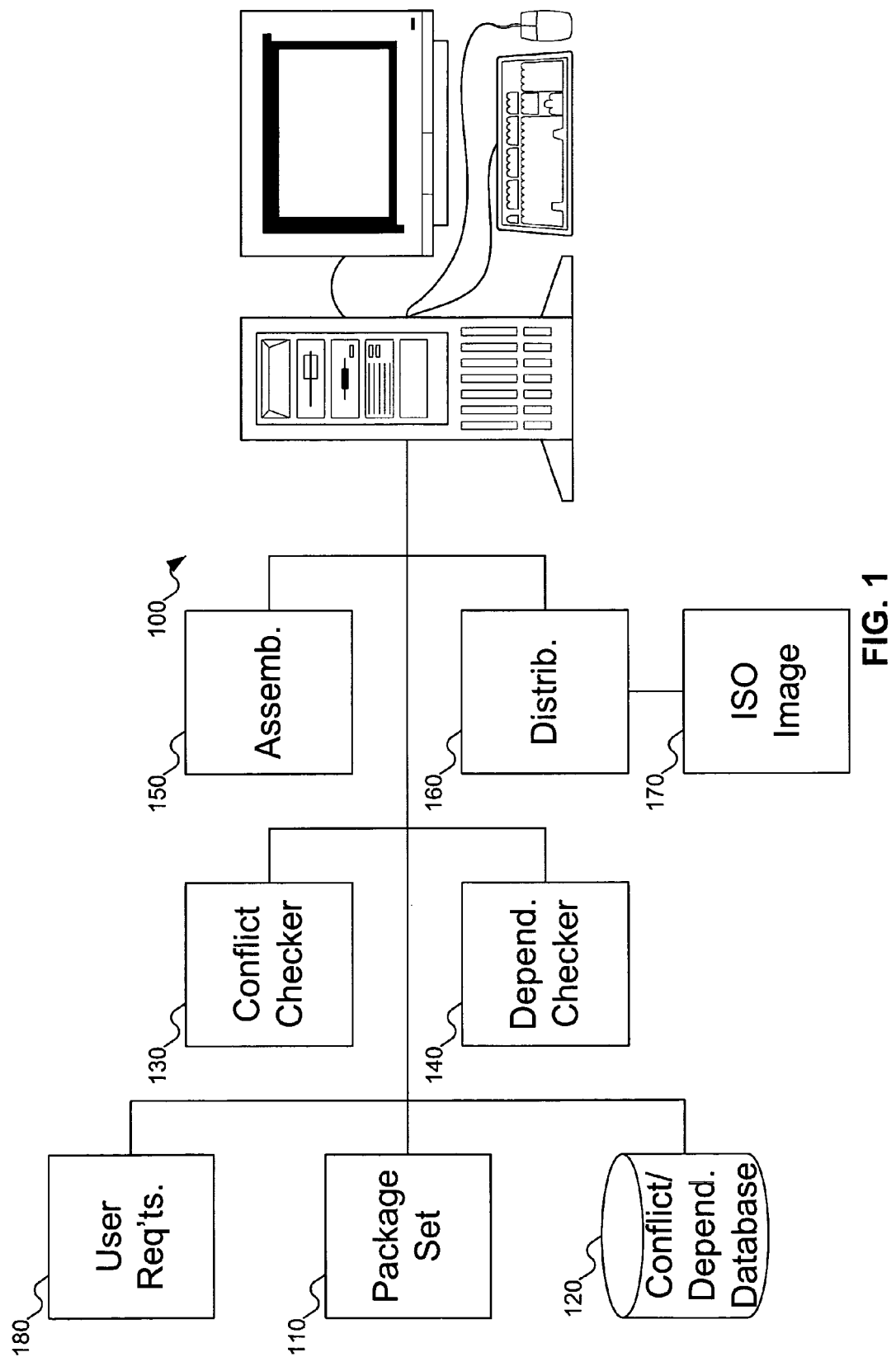
FIG. 1 shows a system on a computer configured to support a distribution of Linux on demand, according to an embodiment of the invention.

FIG. 1 shows a system on a computer with a set of available packages, a set of user requirements, a database with dependency and run-time conflict information, a conflict checker, a dependency validator, an assembler to assemble a distribution on demand, the distribution, and an ISO image of the distribution, according to an embodiment of the invention. Computer 100 includes all the typical elements of a computer, such as a central processor, memory, bus, disk space, etc. Also, computer 100 can be accessed locally, or remotely over a network, such as a LAN, WAN, the Internet, etc., which can be reached via either a wired or a wireless (such as IEEE 802.11a/b/g/n, among others) connection.

Available on computer 100 is a set of, for example, Linux packages 110 available for the customized distribution. The set of Linux packages 110 are packages that have been developed for Linux and are available to Linux users. The packages can include, for example, versions of the Linux kernel, as well as other software by developers from all over the world. Each of these packages is designed to address a particular aspect of the distribution. For instance, in one embodiment of the invention there could be a package that handles computer security or another that acts as a mail server. A means for selecting packages that satisfy the user's requirements is discussed in greater detail below.

Computer 100 also contains a set of user requirements 180 input for a particular customer. The set of user requirements 180 describe the features of Linux that the customer is interested in getting. For example, a customer might desire a Linux system that includes only a file system and a web server. Another customer might desire a system that contains the most robust security features. While in one embodiment of the invention the set of user requirements is included in computer 100, a person skilled in the art will recognize that the set of user requirements can also be stored in other forms: perhaps not even in electronic form. For example, a customer could tell a sales representative the features that the user is interested in having. If the sales representative is knowledgeable about what features are in each of the packages available for selection, then the sales representative can select packages that meet the user's requirements. And if the customer wants features not presently available in an existing package, the manufacturer can use the customer's requirements to design for the customer a new package that meets the customer's requirements. This custom design can be done by anyone skilled in developing packages; often, this will not be the sales representative who is identifying the customer's requirements.

Figure 12:
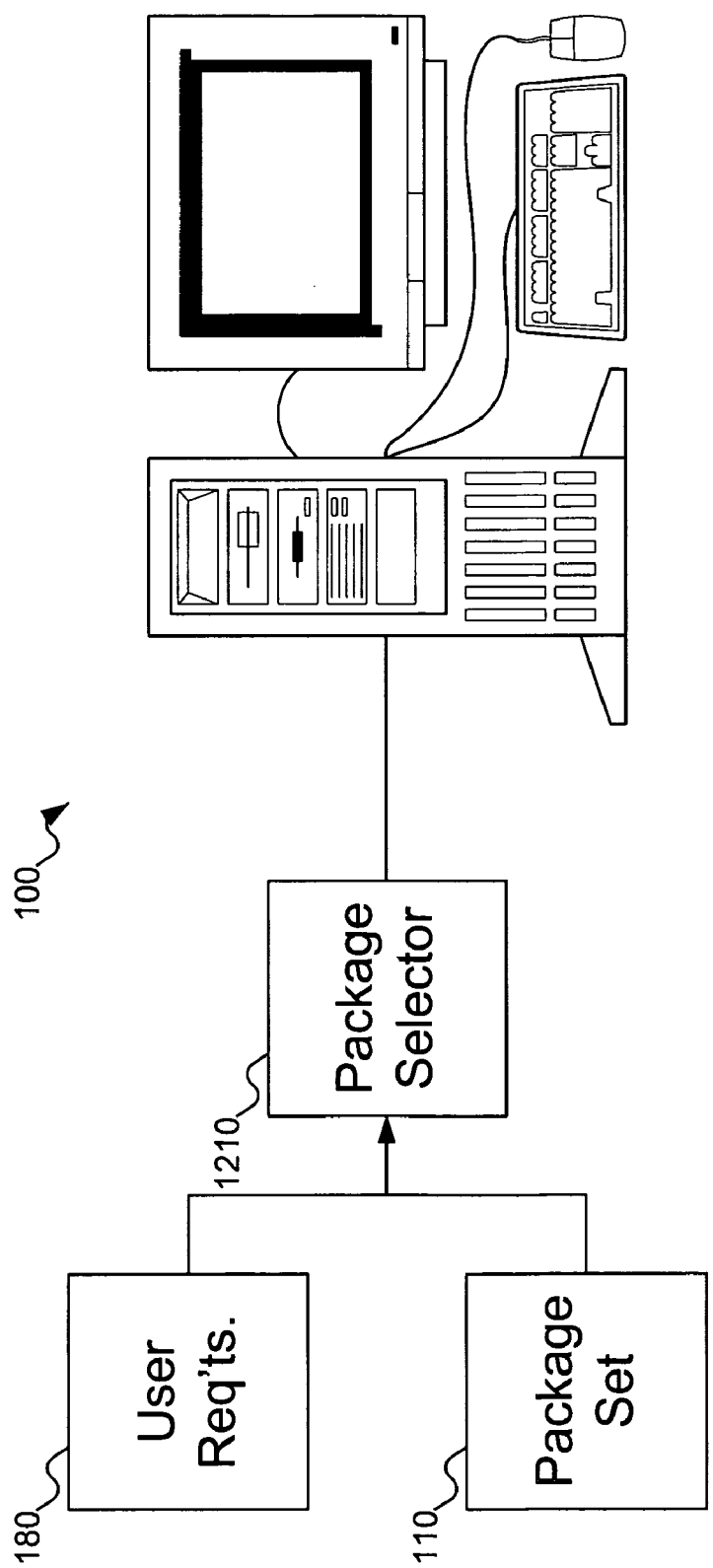
FIG. 12 shows a package selector to select from the set of packages of FIG. 1 based on the user's requirements.

In an embodiment of the invention, the computer system also includes a package selector to select packages to be included in the distribution. FIG. 12 illustrates an example of this embodiment. The package selector 1210 identifies packages from the set of packages 110 that will satisfy the user requirements 180. As described above, the package selector 1210 can be a sales representative (i.e., a person) who is familiar with the various packages and is capable of selecting packages for the user requirements 180. In another embodiment, the package selector 1210 could be software that is able to match packages to the user requirements 180. In yet another embodiment, the package selector 1210 can be software that enables a person who is familiar with the various packages to select packages that meet the customer's requirements 180. In some instances, a person knows the capabilities and intricacies of certain packages. In these embodiments, the package selector 1210 uses the customer's requirements to identify and select packages that satisfy the user's requirements.

Returning to FIG. 1, in the event that no package exists to satisfy the user's requirements, in an embodiment of the invention, a new package can be developed to serve this function. The new package can be tested to ensure it does not conflict with the other packages (or to identify existing packages that the new package conflicts with) and then can be included in the distribution. Once the new package has been developed for the customized distribution, it can be added to the set of packages 110 that are available for inclusion in future customized distributions.

In an embodiment of the invention, some packages in the set of the packages 110 can be designed to operate by themselves (other than needing the kernel). There can also be packages that are to be used in conjunction with one or more other packages. In some cases, the two packages provide features that complement one another. And then in other cases, one of the packages is a primary package that the secondary package depends on. In these last cases, there is a dependency between the primary package and the secondary package. If a distribution includes the secondary package but not the primary package, the secondary package might not operate properly (if it operates at all). Thus, dependencies are a concern that needs to be addressed and are described in greater detail below.

In addition, some packages in the set of packages 110 might not be compatible with other packages. In other words, these packages conflict: they are not interoperable at run-time. While one or the other of the packages can work at run-time, both might not. Users installing a customized Linux distribution obviously would expect that all the packages built into the distribution will run. Thus, conflicts are a concern that needs to be addressed.

To solve these problems, computer 100 includes database 120 that stores conflict and dependency information, making it possible to verify that no packages will conflict at run-time and that all required dependencies will be included. Computer 100 also includes conflict checker 130 to ensure that none of the selected packages will conflict at run-time, and dependency validator 140 to validate that all dependencies of selected packages are also selected.

Once the Linux packages have been selected and checked for conflicts and dependencies, assembler 150 can then assemble the selected packages into a distribution 160 for installation. In one embodiment of the invention, the assembler assembles the distribution 160 as an ISO image file 170. In another embodiment of the invention, assembler 150 assembles the source code into a distribution, but does not compile the modules into executable or object modules.

After the set of Linux packages 110 is assembled into a distribution, the distribution is typically written to a compact disc (CD), or other medium that can store the distribution, for installation by the customer. In addition, a person skilled in the art will recognize that the set of Linux packages 110 could be distributed in other manners: for example, by being available for download from a website across a network. All of these elements are discussed in greater detail below.

Figure 2:
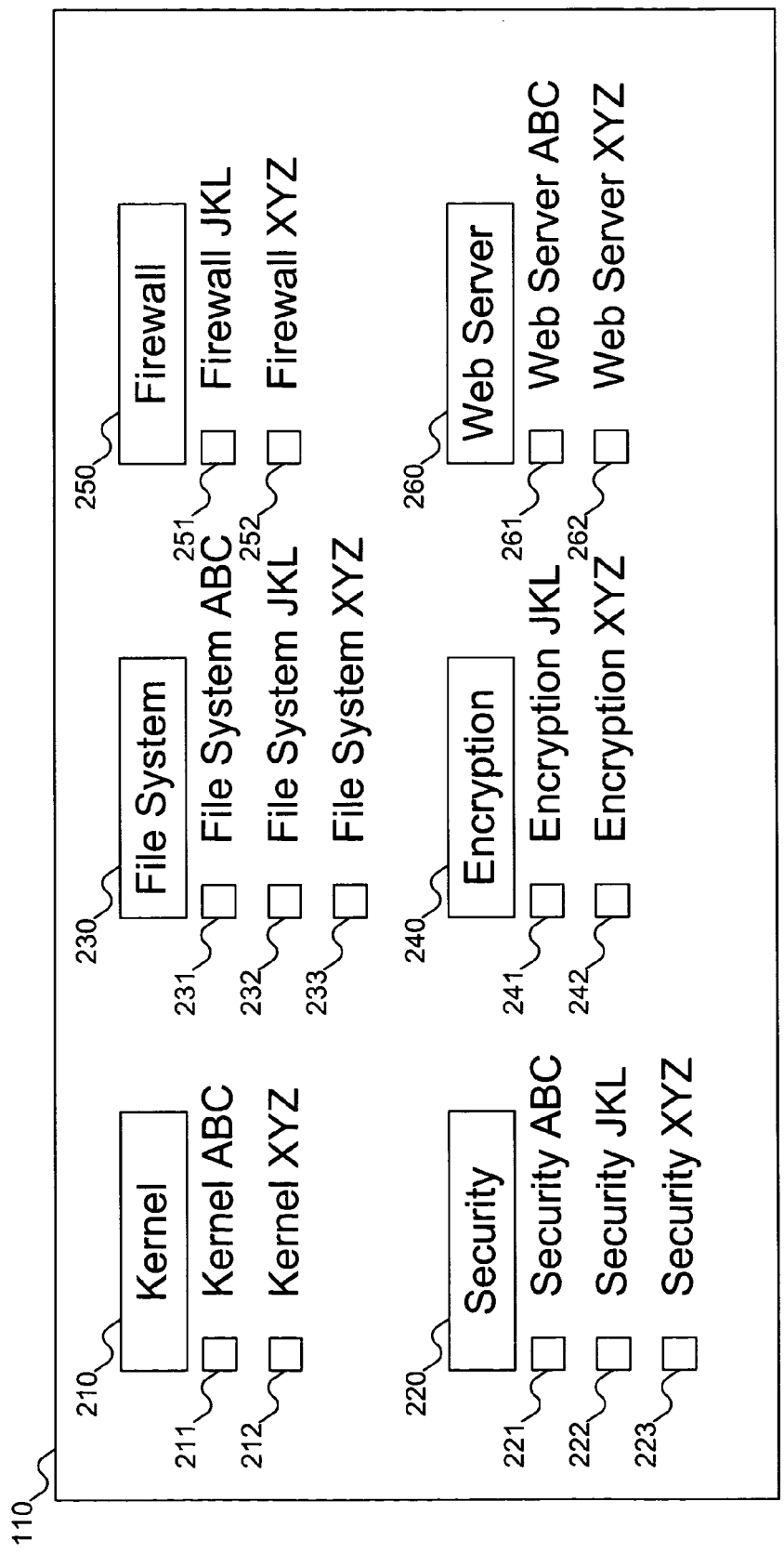
FIG. 2 shows an example of the set of packages of FIG. 1 that are available for selection.

FIG. 2 shows an example of a set of packages 110 in FIG. 1 that are available for selection, according to an embodiment of the invention. In the example set of packages 110, there are six package categories, kernel 210, security 220, file system 230, encryption 240, firewall 250 and web server 260, as well as two to three packages for each category. While the present embodiment has only six categories and fourteen packages, a person skilled in the art will recognize that the categories are not required. In addition, the set of packages can be organized into any number of categories and any number of packages per category (and, of course, any number of total packages).

The customer of the Linux distribution does not have to be familiar with the various packages, but rather determines what requirements must be met by the Linux distribution. According to an embodiment of the invention, one user requirement can be a hardware requirement. Different packages are built for, and run on the various computer architectures, such as the i386, i586, x86-64, PPC, PPC64, IA64, and s390 microprocessors, among others. A person skilled in the art will recognize that these microprocessors and others can implement a Linux operating system, and thus can be included in the set of user requirements.

In an embodiment of the invention, the set of packages 110 available for the customized distribution can be stored and presented via a user interface to help simplify the selection of a package to satisfy a user requirement. For example, the packages can be stored in a database with information that can be applicable to a particular requirement. There could be different viewings of the information, such as ways to view all packages that satisfy a user requirement. The interface could also include other information about the package, such as how quickly it runs, or how much memory it uses. In addition, the information about a package could include other packages with which the package works well. By organizing the data in such ways, the sales representative or other person choosing the packages for the customized distribution can more easily find the best package for the customer.

Figure 11:
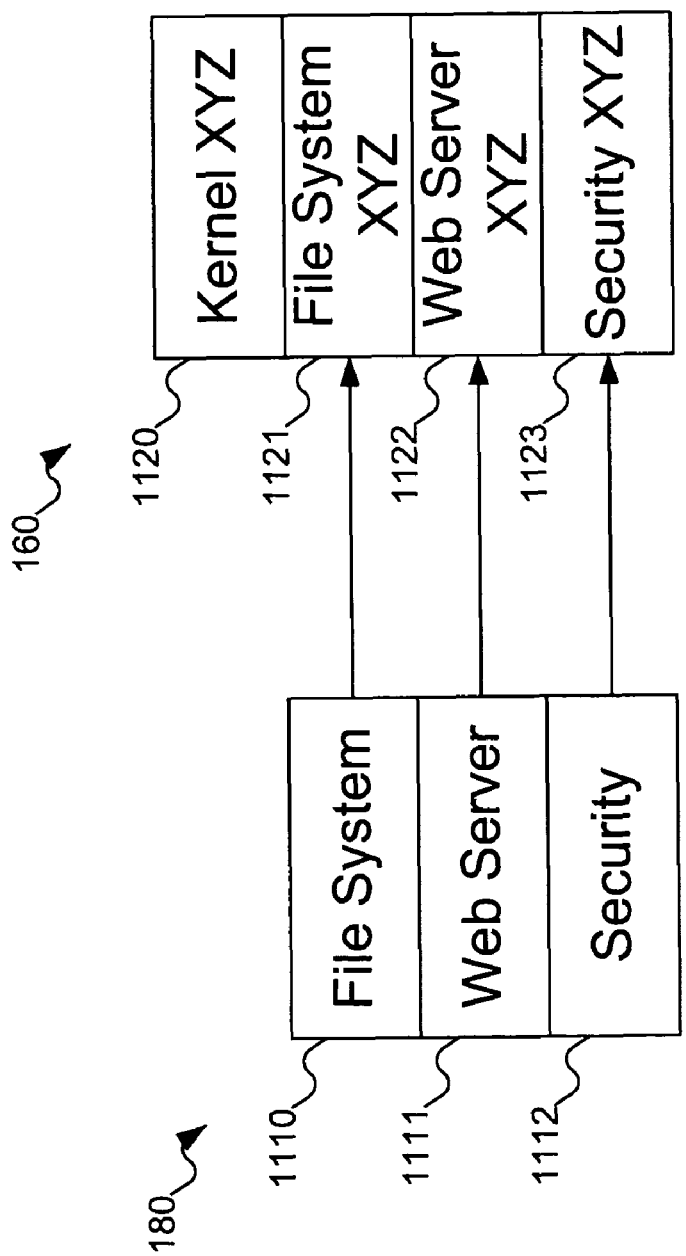
FIG. 11 shows a set of user requirements of FIG. 1 and a corresponding distribution that satisfies the user requirements.

Other user requirements can include functionality and features that should be included in the Linux distribution. FIG. 11 shows an example of the set of user requirements in FIG. 1 and a corresponding distribution that satisfies the user requirements, according to an embodiment of the invention. The set of user requirements 180 illustrates that a particular customer is interested in a Linux system with File System 1110, Web Server 1111, and Security 1112 capabilities. Packages 1120-1123 are selected from the set of available packages to meet the customer's requirements, and built into distribution 160 that meets these requirements.

In this example, distribution 160 includes Kernel XYZ 1120, File System XYZ 1121, Web Server XYZ 1122, and Security XYZ 1123. File System XYZ 1121 is included to meet the File System 1110 user requirement, Web Server XYZ 1122 is included to meet the Web Server XYZ 1111 user requirement, and Security XYZ 1123 is included to meet the Security XYZ user requirement. While in this example the kernel was not included in the set of user requirements, it is a core component of a Linux system, and as such, a kernel is included in customized distributions. A person skilled in the art will recognize that while this distribution 160 includes Kernel XYZ 1120, File System XYZ 1121, Web Server XYZ 1122, and Security XYZ 1123, there may be other configurations of packages that also satisfy the user requirements 180.

In an embodiment of the invention, an available set of user requirements for selection by a user can be on the computer system of FIG. 1. The user requirements that are available can be presented with a user interface that provides easy selection of requirements. By maintaining this information on the computer system, computer software can be created to select packages that satisfy the user requirements. In some cases, the user requirements can be requirements that the software is able to use to select packages for the distribution. For example, if a user has a fairly straightforward set of requirements, with the exception of having a unique security requirement, the software can first select the specialized package to satisfy the security requirement (because there is less flexibility in satisfying this feature), and then select other packages to meet the standard Linux user requirements.

In an embodiment of the invention, the packages built into a distribution are compiled binary files that the user will be able to run immediately after installing the distribution. In the prior art, customers built distributions by compiling source code components from different vendors. Because compiler settings can affect the behavior of software, even technically skilled users could inadvertently build a distribution that would not work as intended. By providing the user with compiled modules, embodiments of the invention avoid these problems, and save the user time (in that the user does not have to spend time building the distribution from the source code).

While a major concern in customizing a distribution is that the packages in the distribution meet the user requirements, other considerations go into the selection of packages. For example, packages need to be interoperable at run-time, meaning that no packages in the distribution conflict during execution of the Linux system. Also, if any packages in the distribution are dependent on other packages, then those needed packages should also be included in the distribution in order for the distribution to function properly.

Figure 3:
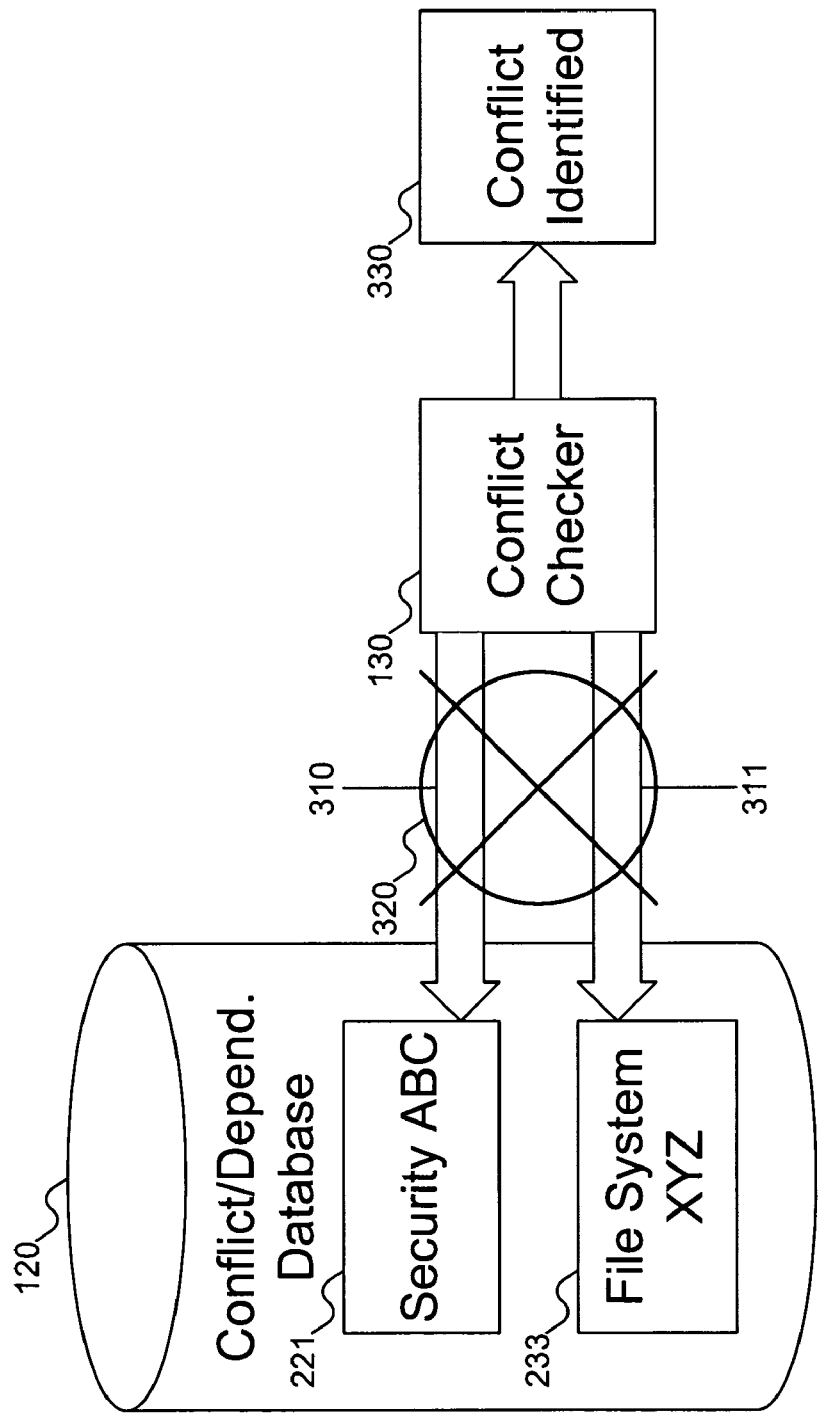
FIG. 3 shows an example of two packages from the database of run-time conflict information of FIG. 1 that will conflict at run-time.

FIG. 3 shows an example of the computer of FIG. 1 identifying two packages that will conflict at run-time using the database of run-time conflict information in FIG. 1, according to an embodiment of the invention. In FIG. 3, the distribution includes packages "security ABC" 221 and "file system XYZ" 233. The conflict checker 130 obtains information about the security ABC package 221 from conflict database 120 with locator 310, and information about file system XYZ package 233 from conflict database 120 with locator 311 (which can, of course, be the same locator). In the example shown in FIG. 3, conflict checker 130 determines that the packages conflict, represented by conflict symbol 320, and presents message 330 to the package selector, so that the conflict can be resolved.

In another embodiment, the selected packages might be packages that do not conflict at run-time. In this case, the conflict checker 320 does not prompt the package selector to resolve the package conflict, and instead compares the other packages in the set of selected packages in search of conflicts. FIG. 4 shows an example database table in the database in FIG. 1 that records packages that conflict at run-time, according to an embodiment of the invention. Table 120 is a table with rows 410-414 and columns 420-424 representing the various packages, such as Kernel XYZ 410. In the example shown in FIG. 4, there is only conflict information for five packages, but a person skilled in the art will recognize that in other examples there can be any number of packages.

Conflict information is represented by an X, such as Xs 430, 431, 432, 433, 434, 435, in entries in table 200. For each pair of packages that has a conflict, table 200 stores an indication of this conflict in the appropriate table entry. For example, X 430 represents a conflict between package "security ABC" in column 421 and package "kernel XYZ" in row 410. The conflict 430 means that a distribution containing both kernel XYZ and security ABC will not be interoperable at run-time. In other words, while the kernel XYZ package can operate on its own, and can interoperate with other packages, kernel XYZ does not interoperate with security ABC at run-time. (Presumably, there is some other version of the kernel that interoperates with security ABC, or else security ABC cannot be used at all.)

Although FIG. 4 shows conflict information being arranged in an N×N table, where N is the total number of packages, a person skilled in the art will recognize that there are other ways of recording conflict information. For example, database 120 includes redundant information, in that every combination of packages is represented twice. For example, Xs 430 and 431 both represent a conflict between kernel XYZ and security ABC. Other embodiments of the conflict information can include linked lists, arrays, etc. In addition, a person skilled in the art will recognize that other conflict combinations are possible, and will recognize how to modify database 120 to store this additional information. For example, there may be three different packages, which include no pair-wise conflicts, but as a trio conflict.

Figure 5:
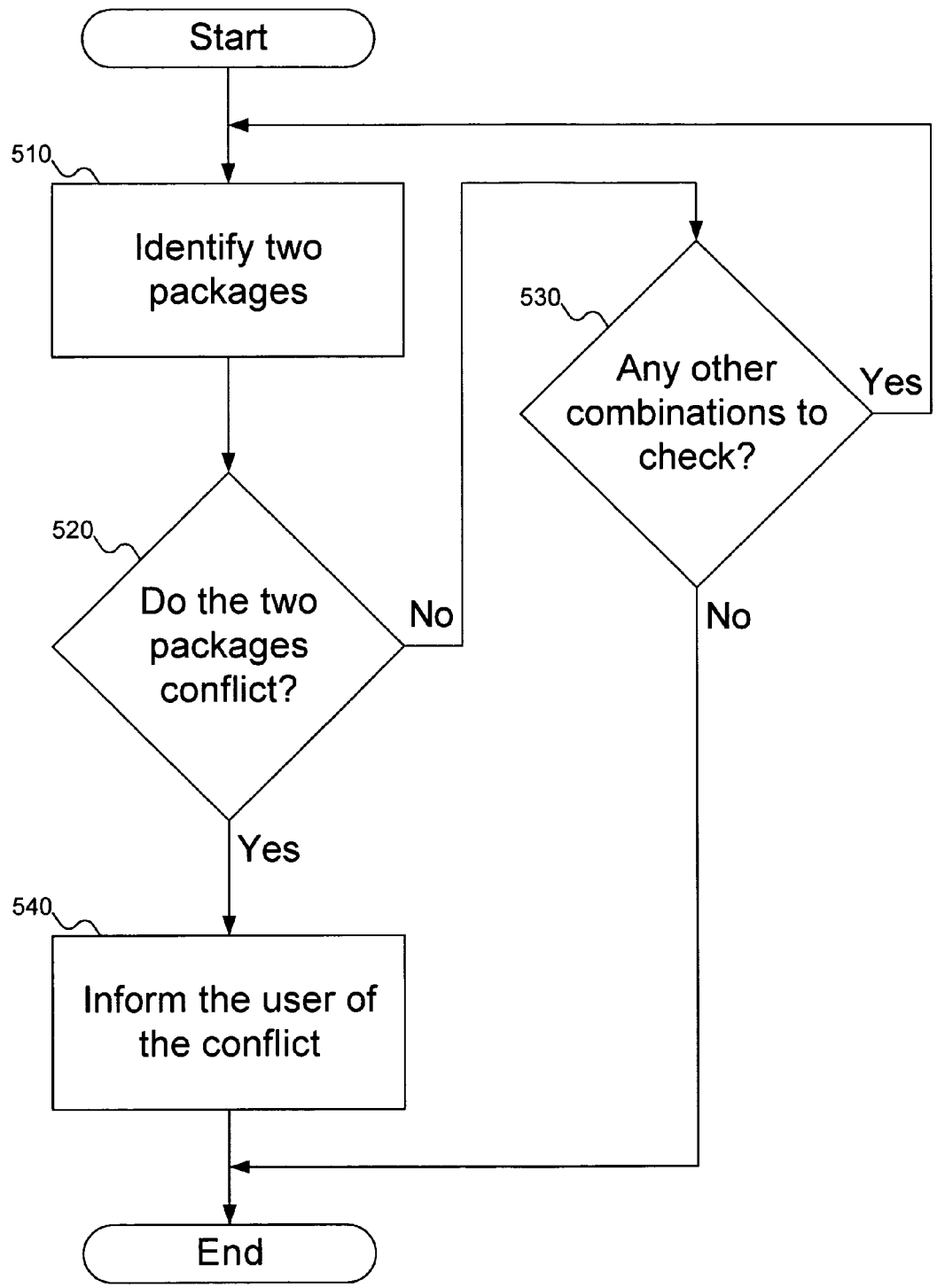
FIG. 5 shows a flowchart of the procedure used by the conflict checker of FIG. 1 to resolve conflicts in packages.

FIG. 5 shows a flowchart that the conflict checker 130 in FIG. 1 uses to resolve run-time conflicts in packages, according to an embodiment of the invention. In step 510, the conflict checker starts by identifying two of the packages that have been selected for the distribution. In step 520, the conflict checker refers to the database to see if the packages have a run-time conflict. If there is a conflict with the packages, the user is alerted with a message at step 540. Otherwise, at step 530 the conflict checker looks to see if there is another combination of packages to check. If there are no more combinations, the conflict checker finishes, having successfully validated that no selected packages contain any run-time conflicts. If there are more combinations of selected packages, the conflict checker 130 then goes back to step 510 and begins the process all over again. FIG. 5 is described in an abstract model (for example, FIG. 5 does not specify exactly how the conflict checker selects packages in step 510). But a person skilled in the art will recognize how to adapt FIG. 5: for example, by using nested loops to select pairs of packages. A person skilled in the art will also recognize how to adapt FIG. 5 to check for conflicts among groups of packages larger than two.

In an embodiment of the invention, the conflict checker analyzes all combinations of packages before alerting package selectors of existing run-time conflicts. The system then notifies the package selector as to which packages had conflicts, and prompts the user to make a different selection of packages that do not conflict at run-time. When the package selector has made a different selection, the conflict checker again checks to see if the new selection of packages has introduced any new conflicts between packages.

In another embodiment of the invention, the conflict checker can provide the package selector with a recommendation for resolving the current run-time conflict. Sometimes a conflict between packages might have a relatively straightforward resolution. For example, there might be one package that conflicts with several others. If those other packages do not conflict with any more packages, then the system could recommend an alternative package to the one that is causing the numerous conflicts.

In yet another embodiment, the means of resolving a package conflict might not be as straightforward. For example, it could be the case that two packages conflict with each other, but not with any other packages in the set of selected packages. In this case, it is not necessarily clear which of the two conflicting packages should be replaced with an alternative non-conflicting package. In this case, the conflict checker can at least alert the package selector to which packages are in conflict.

Figure 6:
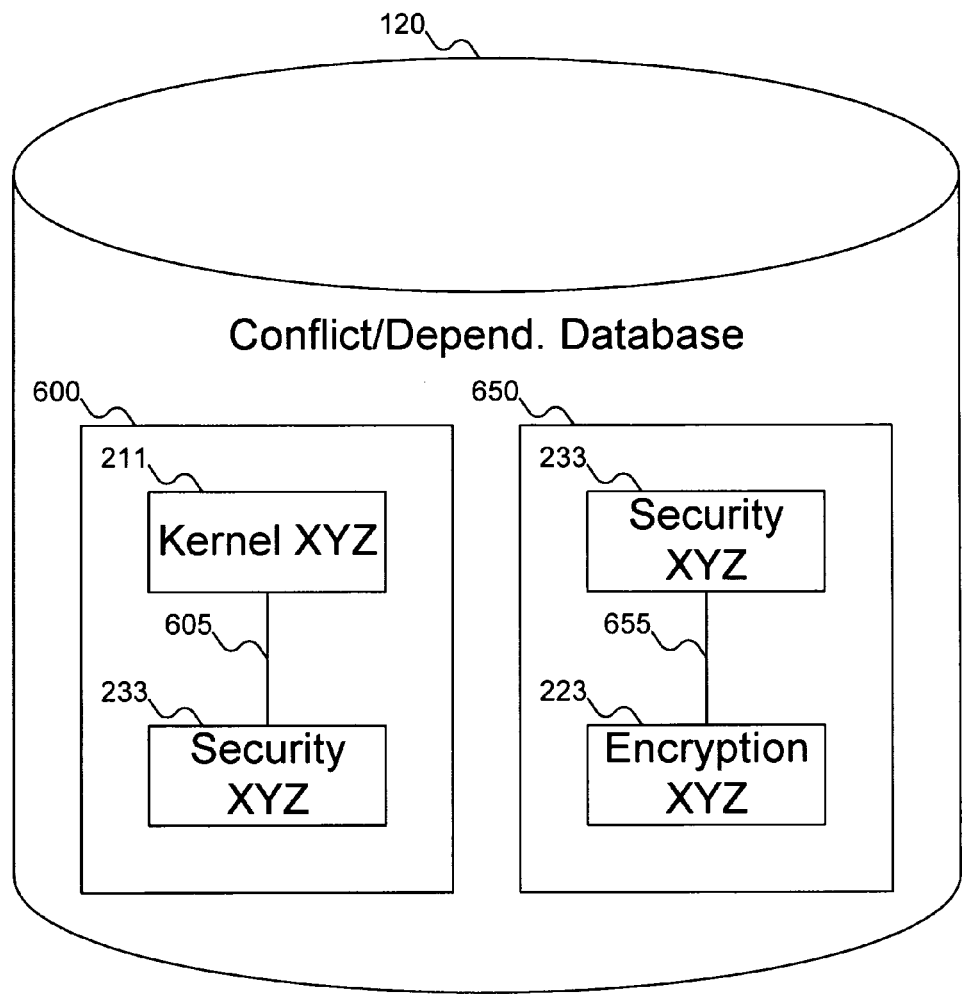
FIG. 6 shows an example of dependency information stored in the database of FIG. 1.

FIG. 6 shows an example of dependency information that is stored in database 120 in FIG. 1, according to an embodiment of the invention. In the present embodiment, two dependencies are shown. In dependency 650, Encryption XYZ 223 has a package dependency of Security XYZ 223. So if Encryption XYZ 223 is in the distribution, then Security XYZ 223 should also be included in the distribution for the encryption software to run.

Similarly, dependency 600 shows that Security XYZ 233 requires that Kernel XYZ 211 be selected and included in the distribution. As a result, a selection of Encryption XYZ 223 will require that not only Security XYZ 233 be selected and included in the distribution, but also that Kernel XYZ 211 be selected and included in the distribution.

As can be seen, the example of FIG. 6 shows only immediate dependencies, under the assumption that any indirect dependencies are captured by checking the dependency information for the needed package. Thus, dependency 650 does not reflect that Encryption XYZ 223 depends (indirectly) on Kernel XYZ 211, as this information is represented through dependency 600. But a person skilled in the art will recognize that database 120 can store all the dependencies for a single package, whether direct or indirect. Thus, dependency 650 can be modified to reflect that Encryption XYZ 223 is also dependent on Kernel XYZ 211.

Figure 7A:
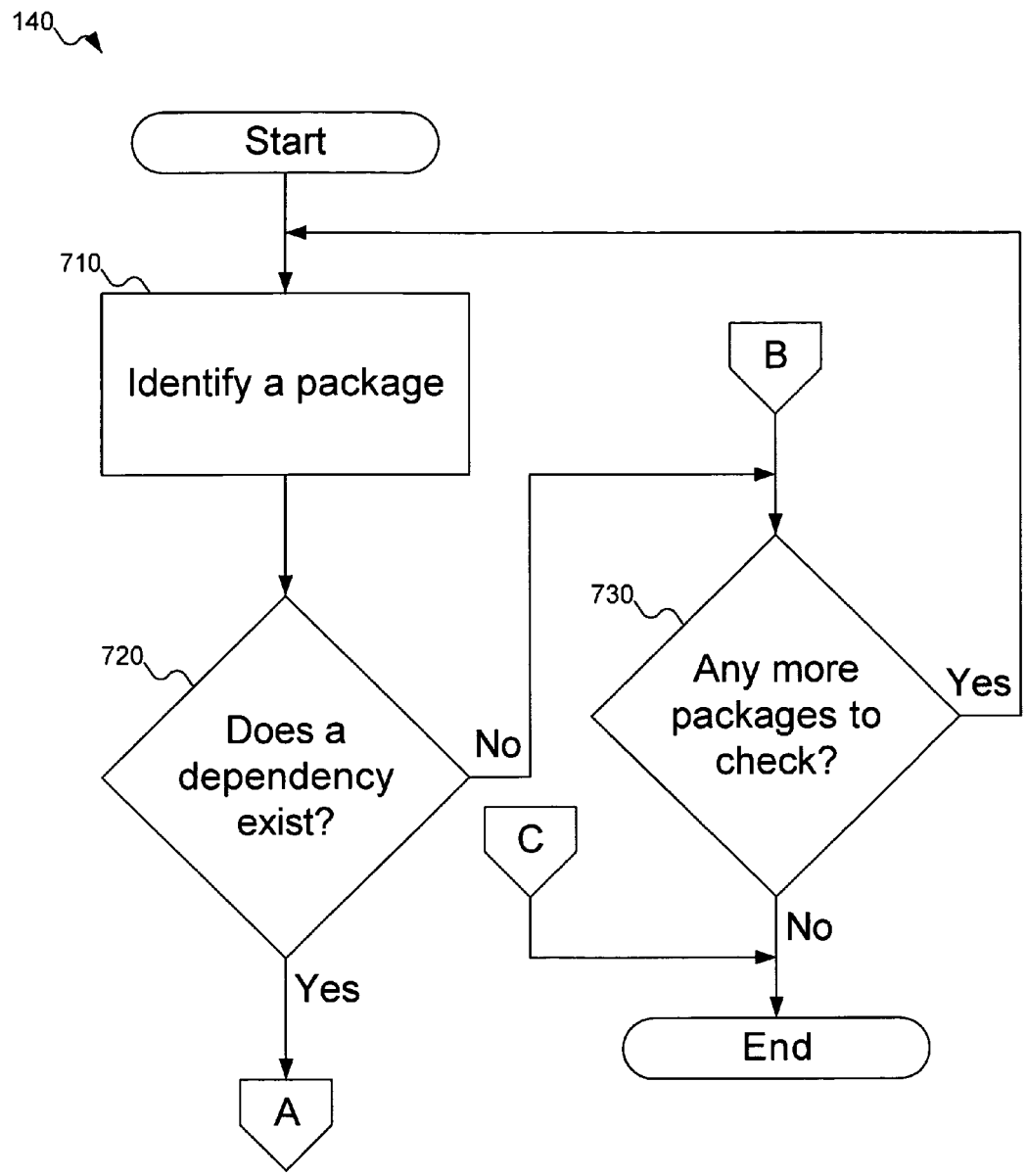
FIGS. 7A-7B show a flowchart of the procedure used by the dependency validator of FIG. 1 to validate that the necessary package dependencies are included in the customized distribution.
Figure 7B:
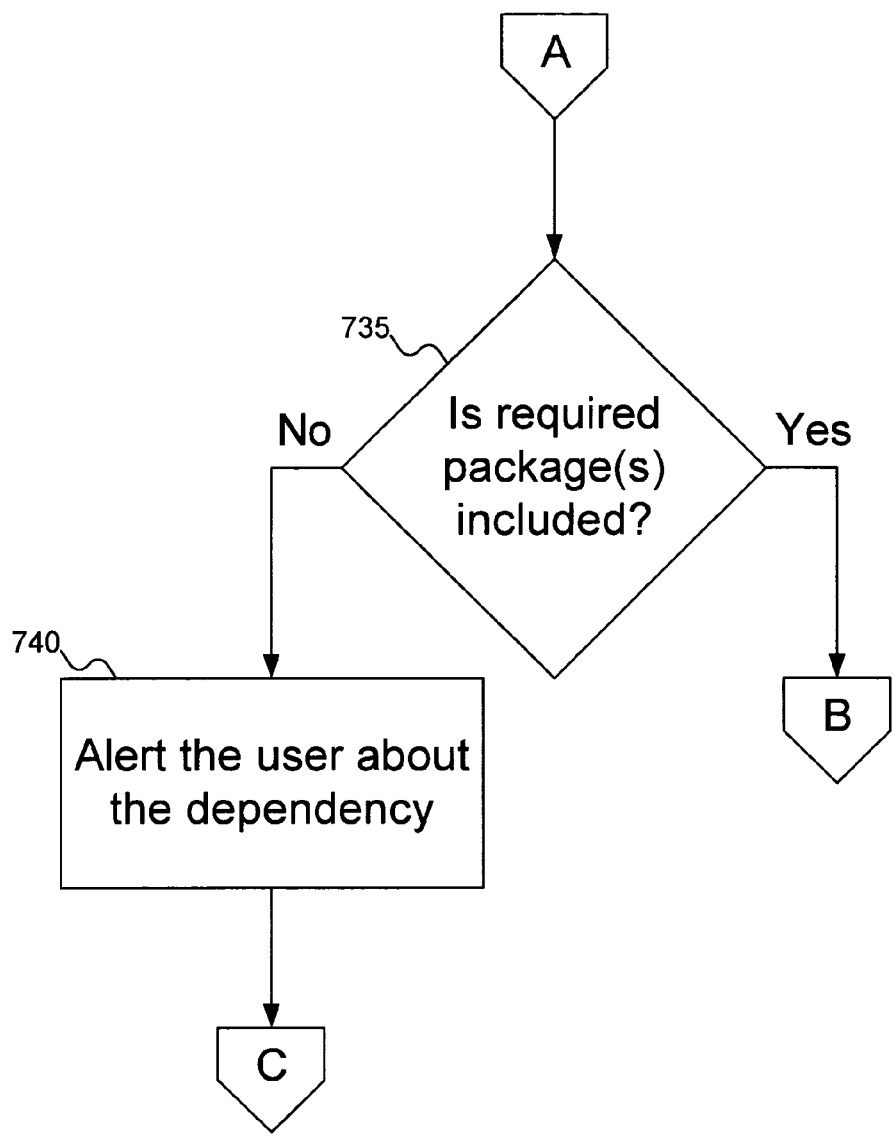

FIGS. 7A-7B show a flowchart of the procedure used by the dependency validator 140 of FIG. 1 to validate that the necessary package dependencies are included in the customized distribution, according to an embodiment of the invention. In FIG. 7A, at step 710, the dependency validator begins by identifying a package. In step 720, the dependency validator looks up that package in the dependency database 120, and checks to see if that package depends on any other packages. If a dependency does not exist, then the dependency validator goes to step 730 and checks to see if there are more packages that need dependency checking. If at step 730 there are more packages to check for dependencies, then the dependency validator returns to step 710 and identifies the next package to move through the flowchart again. However, if at step 730 there are no more packages that need to be checked for dependencies, the dependency validation is complete, and the selected packages can be built into a distribution with the assurance that all required dependency packages are included.

If at step 720, a dependency does exist for the package being checked, then the dependency validator goes to step 735 (in FIG. 7B), and checks to see if the needed package(s) is/are included in the selected set of packages. If the needed package(s) is/are not selected for inclusion in the distribution, then at step 740 the dependency validator alerts the user of the missing package(s) so that the needed package(s) can be selected and included in the distribution (or, alternatively, the selected package removed from the distribution to avoid including the needed package). If at step 735 the needed package is selected for inclusion in the distribution, then the dependency validator goes back to step 730 (in FIG. 7A) where, as described above, the dependency validator checks to see if there are any more packages that need dependency validation.

While one embodiment of the invention alerts the user to a dependency issue as soon as a problem is identified, another embodiment can check all the packages in the selected set and identify all missing but needed packages before alerting the user of the missing packages. In yet another embodiment, the dependency checker can check for dependency packages as soon as a package is selected. While packages are being selected, it can select the dependency package and note the automatic selection of the additional package (so that the user is aware of this automatic selection). If a needed package is removed from the set of selected packages, then the original package can be removed as well (again, with the system notifying the user of this automatic action). In one embodiment, the alerts of dependency packages can be in the form of a dialog box, but a person skilled in the art will recognize that there are other ways of alerting the package selector of missing dependencies, such as text in the selection interface itself, log files or windows, etc.

While the embodiments of dependencies described thus far have included a package with only one dependency package, a package can also be dependent on the existence of at least one package in a set of packages. For example, a particular security package might not require a specific kernel, but rather any kernel of a specified version or greater. In this situation, when the dependency validator sees the particular security package, the dependency validator then checks for a kernel that is in the set of dependency packages that will satisfy the dependency requirement for the security package. Similarly, a selected encryption package can only require that a security package be included for the encryption package to be operable. In this case, it is not important which security package is included, only that one security package is included. A person skilled in the art will also recognize other combinations of dependencies that can be tested for.

Figure 8:
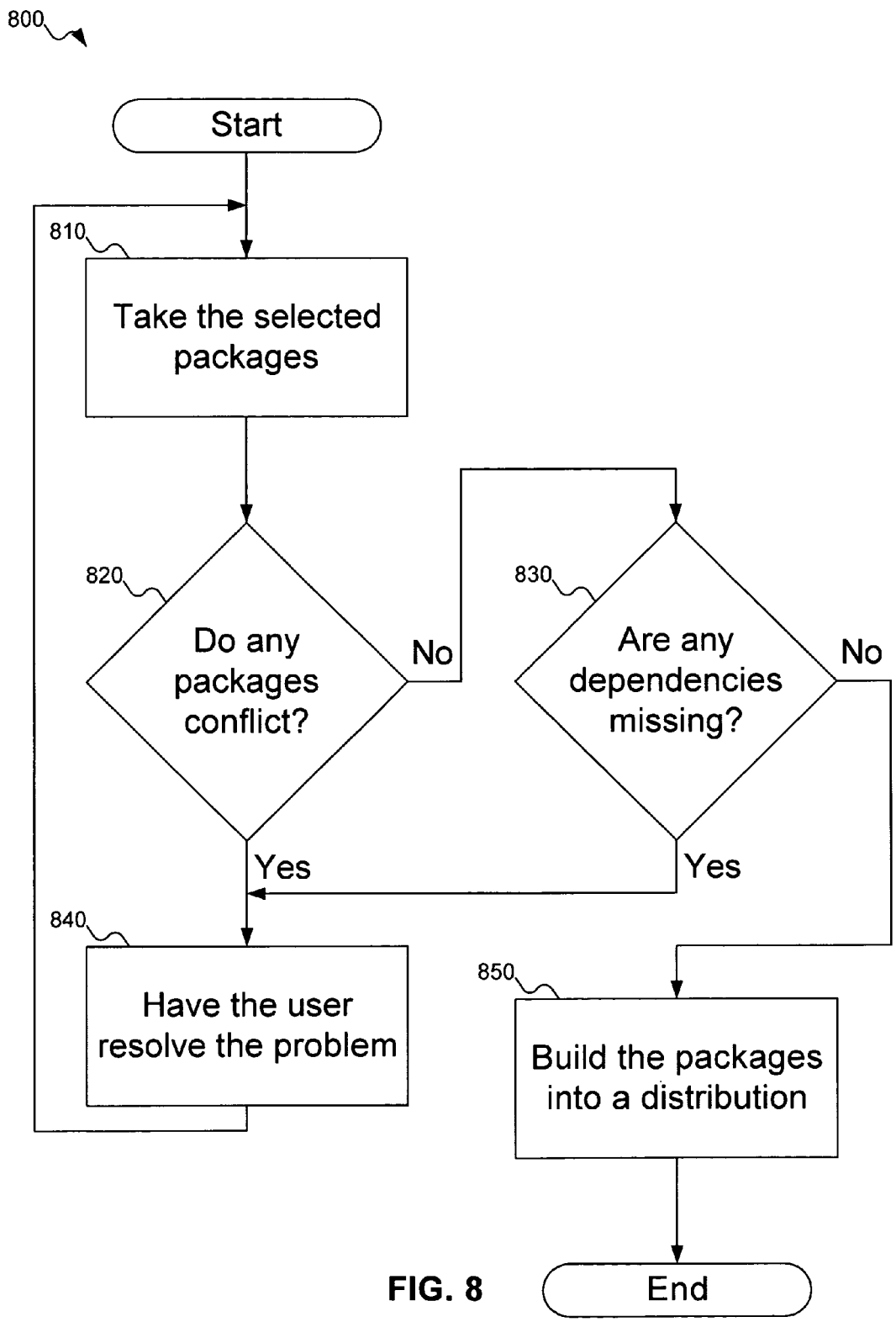
FIG. 8 shows a flowchart of the procedure used by the assembler of FIG. 1 to assemble a distribution with both dependency package validation and conflict resolution for all packages in the distribution.

FIG. 8 shows a flowchart of the procedure used by the assembler 150 in FIG. 1 with both dependency package validation 140, and conflict resolution 130 for all packages in the distribution, according to an embodiment of the invention. In step 810, the assembler starts with the set of selected packages. In step 820, the assembler checks to see if any packages conflict, as described above with reference to FIG. 5. If no packages conflict, then the assembler goes to step 830 and validates that the necessary dependency packages are included in the set of selected packages, as described above with reference to FIGS. 7A-7B.

If at step 820 the conflict checker 140 identifies packages that will conflict at run-time, or if at step 830 the dependency validator 130 identifies dependencies that must be selected and included in the distribution, the assembler goes to step 840, where it prompts the user to resolve the issues in the selected packages. If at step 830 the dependency validator finds no missing dependencies (and no conflicts), the assembler goes to step 850 where the packages are assembled into a distribution. In one embodiment, this can involve compiling the individual modules from source code into object code and linking the object code and libraries together to form the distribution. But a person skilled in the art will recognize other ways in which the distribution can be assembled.

After the distribution 160 is assembled, the customer will be able to install the distribution. In one embodiment of the invention, the distribution can be saved to a compact disk (CD) for the user to install. The customer inserts the CD into the CD drive and runs the installation program. After the installation is successful, the customer is able to use the customized Linux distribution.

Figure 10:
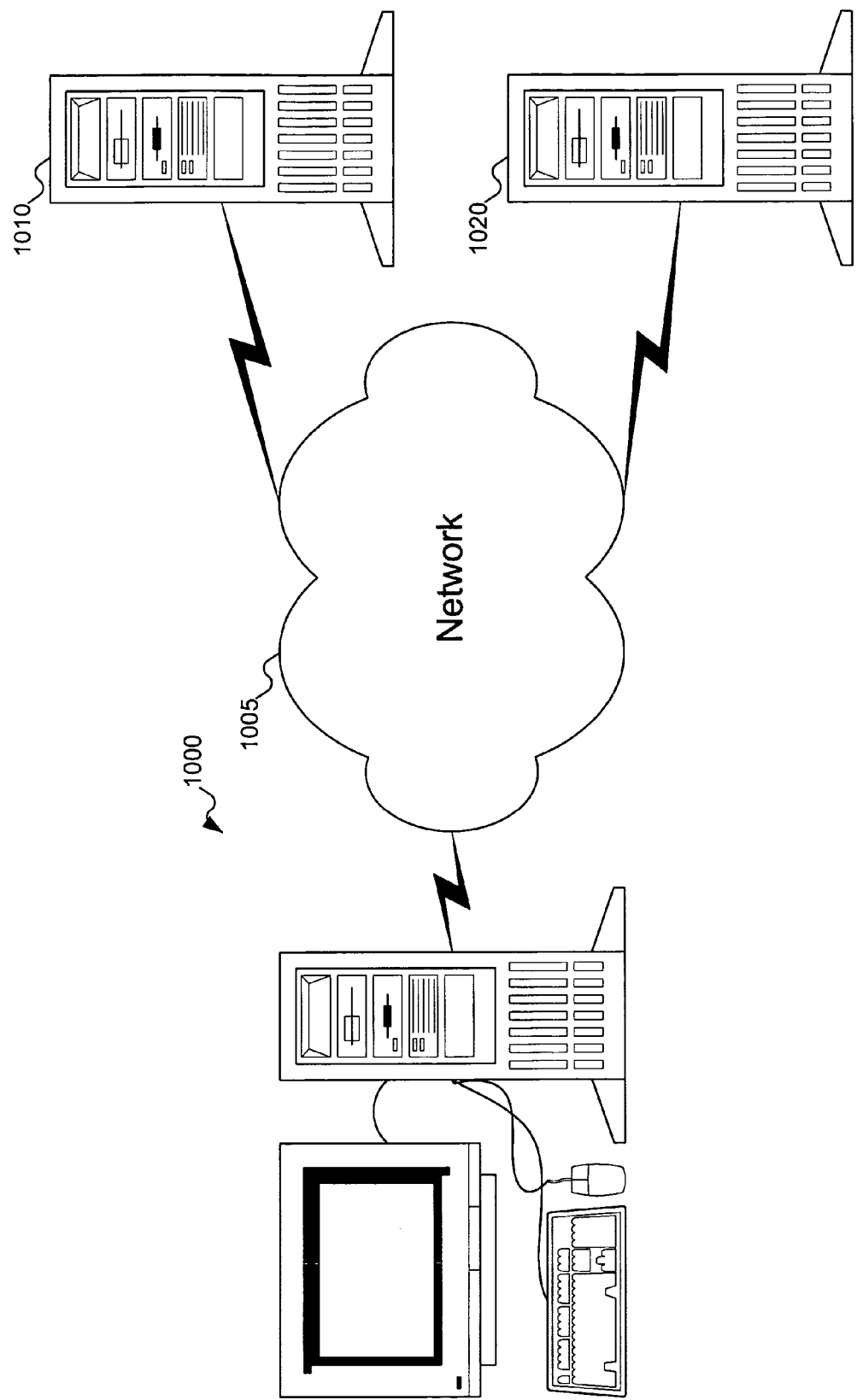
FIG. 10 shows a system where the distribution of FIG. 1 is installed onto remote servers.

In another embodiment the user can install the new distribution over a network to a remote server using an ISO image file 170 (FIG. 1). FIG. 10 shows a system where the distribution 160 of FIG. 1 is installed onto one or more remote servers, according to an embodiment of the invention. In an embodiment shown in FIG. 10, the destinations for the customized distribution are servers 1010 and 1020. Computer 1000 contains the customized distribution as an ISO image file. The ISO file is a complete representation of the file structure of the distribution. The ISO file can then be used over network 1005 to enable installation of the distribution on servers 1010 and 1020.

In an embodiment shown in FIG. 10, server 1010 and server 1020 have remote booting capabilities. When the distribution is ready to be installed, the computer that contains the distribution can remotely boot destination server 1010 and server 1020 and proceed to install the distribution on the remote servers. While this example describes using two destination servers, it should be obvious to a person skilled in the art that any number of servers can be used as a destination for the customized distribution.

Figure 9:
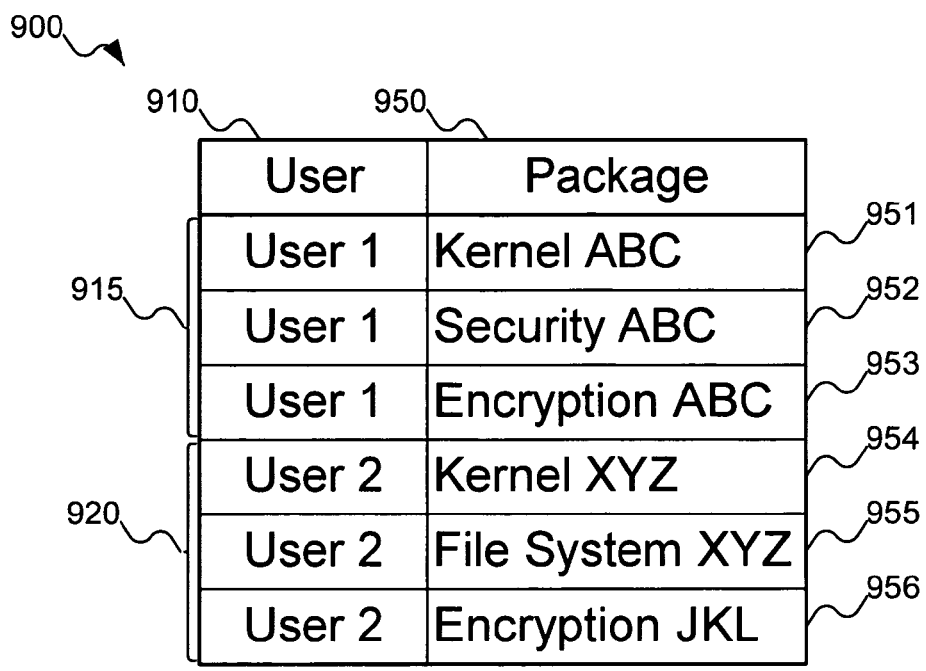
FIG. 9 shows a table identifying what packages a particular user received in the distribution of FIG. 1.

In another embodiment of the invention is a way to retain information about what packages are included in a particular customer's customized Linux distribution. FIG. 9 shows a database table identifying what packages a particular user received in the distribution in FIG. 1, according to an embodiment of the invention. After a distribution is built for a user, information is stored to identify what packages were included for the user.

In table 900, Users in column 910 are matched with Packages in column 950. User 1 in entry 915 created a distribution that included Kernel ABC 951, Security ABC 952, and Encryption ABC 953. In the event that, for example, Encryption ABC 952 is updated, this new version of the package can be added to the set of packages available for creating a customized Linux distribution. However, this updated package can also be distributed to users who have the previous version of Encryption ABC 952. A query for Encryption ABC 952 in Package table 900 identifies User 1 in entry 915 as having installed Encryption ABC 952. This way, User 1 can be notified of the update using some sort of notification mechanism, for example, by e-mail, and User 1 can install the update, if desired. Similarly if Encryption JKL 956 is updated, User 2 in entry 920 can be notified of the update. Although FIG. 9 shows the package information being stored as a table, a person skilled in the art will recognize that there are other ways of recording package information, such as linked lists, arrays, etc.

While currently it is possible to notify Linux users when updates to packages are available, an embodiment of the invention makes it possible for users of a customized Linux distribution to receive notifications only when a package that is in the user's own customized version is updated. In this way, the user does not get bombarded with notices of updates to packages that the user does not have.

In addition to being able to provide customized notifications of package updates, the present embodiment allows a Linux vendor to use the information in table 900 as a basis for a support agreement. That way, a customer is able to get support for packages included in the customer's distribution. Similarly, the vendor knows what packages the customer is entitled to support.

Finally, in an embodiment of the invention, once the customized distribution has been assembled for a particular customer, the distribution can be made available to other customers along with other pre-packaged versions. Although the customized distribution is built to satisfy a particular set of user requirements, it is possible that there is a second customer who shares those user requirements. That second customer can benefit by getting a distribution that is already assembled to satisfy the user requirements and tested for conflicts and dependencies.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And although the foregoing discussion has focused on particular embodiments and examples, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments. Descriptions of the embodiments by reference to Linux are illustrative; the invention can be used with other operating systems and software distributions.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A system for assembly of a customized software distribution to a user, comprising:
   a computer;
   a set of available software packages available on the computer;
   a set of user software requirements, the set of user software requirements specifying desired features for a machine of the user without identifying specific software packages from the set of available software packages; and
   an assembler on the computer to assemble a distribution including a subset of the available software packages that satisfies the set of user software requirements, the subset including at least a first package and a second package and omitting a non-included package of the set of available software packages, the distribution usable to install the subset of the available software packages on the machine of the user.

2. A system according to claim 1, further comprising a database of package dependencies, a package dependency including the first package in the distribution that depends on a third package in the set of available software packages.

3. A system according to claim 2, further comprising an adder to add the third package to the distribution.

4. A system according to claim 3, wherein the adder is operative to automatically add the third package to the distribution as a consequence of the first package depending on the third package.

5. A system according to claim 1, further comprising a validator to validate that the first package in the distribution and the second package in the distribution do not conflict at run-time.

6. A system according to claim 5, further comprising a database including information indicating that the first package and the second package that do not conflict at run-time.

7. A system according to claim 6, wherein the database further includes information indicating that the first package and a third package conflict at run-time, so that the assembler would not select both the first package and the third package for inclusion in the distribution.

8. A system according to claim 1, further comprising a deliverer to deliver the distribution to the user.

9. A system according to claim 1, further comprising an installer to install the distribution.

10. A system according to claim 9, further comprising a notifier so that the system can notify the user of an update package for the distribution.

11. A system according to claim 10, further comprising a distributor to distribute the package update upon request by the user.

12. A system according to claim 11, further comprising an installer to install the update after installing the distribution.

13. A system according to claim 10, wherein the notifier is operative to notify the user of the update without the machine of the user checking whether the update exists.

14. A system according to claim 1, wherein the set of available software packages includes a set of available Linux packages.

15. A system according to claim 1, wherein the assembler includes means for selecting the subset of available software packages from the set of available software packages using the user software requirements.

16. A system according to claim 1, wherein the set of available software packages includes a set of available compiled software packages.

17. A system according to claim 1, wherein the set of user software requirements includes a hardware requirement to execute the subset of the available software packages that satisfies the set of user software requirements.

18. A system according to claim 1, wherein the subset of the available software packages can be one of a plurality of subsets of the available software packages that satisfies the set of user software requirements.

19. A system according to claim 1, wherein the set of user software requirements specifies desired features for a machine of the user using categories without identifying specific software packages from the set of available software packages.

20. A method for generating a customized distribution of software packages for a user, comprising:
   determining a set of available software packages;
   determining a set of user software requirements, the set of user software requirements specifying desired features for a machine of the user without identifying specific software packages from the set of available software packages; and
   generating a distribution of a subset of the set of available software packages that satisfies the user software requirements, the subset including at least a first package and a second package and omitting a non-included package of the set of available software packages, the distribution usable to install the subset of the available software packages on the machine of the user.

21. A method according to claim 20, further comprising:
identifying the first package that is included in the distribution; and
identifying a third package upon which the first package depends.

22. A method according to claim 21, further comprising adding the third package to the distribution.

23. A method according to claim 22, wherein adding the third package to the distribution includes automatically adding the third package to the distribution as a consequence of the first package depending on the third package.

24. A method according to claim 20, further comprising verifying that the first package in the distribution and the second package in the distribution do not conflict at run-time.

25. A method according to claim 20, further comprising delivering the distribution to the user.

26. A method according to claim 25, wherein delivering the distribution includes delivering an ISO image.

27. A method according to claim 20, further comprising notifying the user by a system generating the customized distribution of a package update for the distribution.

28. A method according to claim 27, further comprising:
distributing the package update upon request by the user; and
installing the package update after installing the distribution.

29. A method according to claim 27, wherein notifying the user of a package update for the distribution includes notifying the user of the package update for the distribution without the user checking whether the update exists.

30. A method according to claim 20, wherein determining a set of available software packages includes determining a set of available Linux packages.

31. A method according to claim 20, wherein generating a distribution of a subset of the set of available software packages includes selecting the subset of available software packages that satisfies the user software requirements.

32. A method according to claim 20, wherein determining a set of available software packages includes compiling the software packages to generate the set of available software packages.

33. A method according to claim 20, wherein determining a set of user software requirements includes determining a set of user software requirements, the set of user software requirements including a hardware requirement to execute the subset of the available software packages that satisfies the set of user software requirements.

34. A method according to claim 20, wherein generating a distribution of a subset of the set of available software packages that satisfies the user software requirements includes generating the distribution of the subset of the set of available software packages that satisfies the user software requirements, wherein the subset of the available software packages is one of a plurality of subsets of the available software packages that satisfies the set of user software requirements.

35. A method according to claim 20, wherein determining a set of user software requirements includes determining the set of user software requirements, the set of user software requirements specifying desired features for a machine of the user using categories without identifying specific software packages from the set of available software packages.

36. An article, comprising:
a storage medium, said storage medium having stored thereon instructions, that, when executed by a machine, result in:
determining a set of available software packages;
determining a set of user software requirements, the set of user software requirements specifying desired features for a machine of the user without identifying specific software packages from the set of available software packages; and
generating a distribution of a subset of the set of available software packages that satisfies the user software requirements, the subset including at least a first package and a second package and omitting a non-included package of the set of available software packages, the distribution usable to install the subset of the available software packages on the machine of the user.

37. An article according to claim 36, wherein the storage medium has further instructions stored thereon that, when executed by the machine result in:
identifying the first package that is included in the distribution; and
identifying a third package upon which the first package depends.

38. An article according to claim 36, wherein the storage medium has further instructions stored thereon that, when executed by the machine result in verifying that the first package in the distribution and the second package in the distribution do not conflict at run-time.

39. An article according to claim 36, wherein the storage medium has further instructions stored thereon that, when executed by the machine result in notifying the user by a system generating the distribution of a package update for the distribution.

40. An article according to claim 39, wherein the storage medium has further instructions stored thereon that, when executed by the machine result in:
distributing the package update upon request by the user; and
installing the package update after installing the distribution.

41. An article according to claim 39, wherein notifying the user of a package update for the distribution includes notifying the user of the package update for the distribution without the user checking whether the update exists.

42. An article according to claim 36, wherein determining a set of available software packages includes determining a set of available Linux packages.

43. An article according to claim 36, wherein determining a set of user software requirements includes determining a set of user software requirements, the set of user software requirements including a hardware requirement to execute the subset of the available software packages that satisfies the set of user software requirements.

44. An article according to claim 36, wherein generating a distribution of a subset of the set of available software packages that satisfies the user software requirements includes generating the distribution of the subset of the set of available software packages that satisfies the user software requirements, wherein the subset of the available software packages is one of a plurality of subsets of the available software packages that satisfies the set of user software requirements.

45. An article according to claim 36, wherein determining a set of user software requirements includes determining the set of user software requirements, the set of user software requirements specifying desired features for a machine of the user using categories without identifying specific software packages from the set of available software packages.

* * * * *